United States Patent [19]

Ammann et al.

[11] 4,026,772
[45] May 31, 1977

[54] DIRECT ELECTROCHEMICAL RECOVERY OF COPPER FROM DILUTE ACIDIC SOLUTIONS

[75] Inventors: Paul R. Ammann, Boxford; Glenn M. Cook, Harvard; Charles Portal, Newton, all of Mass.

[73] Assignee: Kennecott Copper Corporation, New York, N.Y.

[22] Filed: July 16, 1975

[21] Appl. No.: 596,458

[52] U.S. Cl. .............................. 204/106; 204/107; 204/108; 204/222; 204/291

[51] Int. Cl.² .................. C25C 1/12; C25D 17/12; C25B 11/12

[58] Field of Search .......... 204/106, 108, 107, 291, 204/222

[56] References Cited

UNITED STATES PATENTS

| | | | |
|---|---|---|---|
| 883,170 | 3/1908 | Christy | 204/291 |
| 3,650,925 | 3/1972 | Carlson | 204/153 |
| 3,853,724 | 12/1974 | Wojcik et al. | 204/108 |

Primary Examiner—R. L. Andrews

[57] ABSTRACT

Recovery of copper and/or other metal values from pregnant, highly dilute liquors and conversion of the barren liquor to a suitable lixiviant; for recovery of copper or other metal values from leaching systems, such as acid treatment of mine waste dumps, vat or heap leaching and insitu mining as part of an overall copper recovery process.

16 Claims, 4 Drawing Figures

DIRECT ELECTROCHEMICAL RECOVERY OF COPPER FROM DILUTE ACIDIC SOLUTIONS

This is a continuation of application Ser. No. 243,207 filed Apr. 12, 1972, and now abandoned.

This invention is directed to the direct electochemical recovery of copper from dilute solutions of pregnant liquor and coproduction of barren liquors for re-introduction as the lixiviant.

BACKGROUND OF THE INVENTION

According to the current practice, copper is recovered by leaching copper bearing ores with weak sulfuric acid solution. Various leaching methods are described by Allison Butts in "Copper — The Science and Technology of the Metal, Its Alloys and Compounds", Hafner Publishing Company, Inc. 1970, pages 307 through 314. In addition to leaching methods described by A. Butts, recent technology allows recovery of copper from ore deposits by in-situ leaching. It is to be understood that the invention described herein has general applicability to the recovery of copper from any dilute acidic copper-bearing solution from any source. For the purposes of this disclosure, however, pregnant leach solutions will be described as having been obtained from heap or dump leaching and in-situ leaching.

A pregnant leach liquor from any of the aforementioned leaching operations may contain from about 0.1 to 10 grams or more per liter of copper. A significant concentration of iron as both ferrous and ferric iron may also be present in some of the pregnant leach liquors. Heretofore, it has been a standard practice to recover copper by contacting the acidic leach solution with iron such as in launders or cones whereby copper is precipitated from the solution. Because of the composition of the leach liquor, several chemical reactions occur in the cementation step, i.e., copper is precipitated, ferric iron is reduced, hydrogen is produced as acid is consumed.

With respect to the ferric iron reduction and hydrogen production, the comsumption of iron is from 2 to 3 pounds per pound of copper being recovered from a leach solution containing about 0.6 gpl copper. However, the stoichometric requirement is only 0.88 pounds of iron consumed per pound of copper recovered. As is evident, the cost of iron and its utilization play a significant part in the recovery of copper. Thus, after separation of the precipitated copper in the cementation process, the barren leach solution is returned to the waste dumps. This leach solution contains iron consumed in the precipitation step. In some operations, an attempt is made to precipitate the iron salts from the solution prior to the return to the leaching operation (depending on the mineralogy of the dump or the in-situ well). However, the problem associated with cementation processes has been the presence of ferric iron, which is detrimental in the cementation step because it consumes iron, that is, the ferric ion is being converted to the ferrous ion species by the iron present in the cementation process.

Inasmuch as a barren, i.e., decopperized solution from the cementation process is returned to the dump and it contains ferrous ions, rather than ferric ions, the dissolving of the copper is reduced thereby. Still further, iron which is being consumed in the cementation step is ultimately deposited in the waste dump.

A general process for leaching of copper ores is described in U.S. Pat. No. 2,563,623 which illustrates a copper recovery process as well as cementation of a pregnant liquor. U.S. Pat. No. 3,103,474 to Juda describes the recovery of metal values by electrowinning such as by hydrogen assisted (at anode) cathodic deposition of copper. In U.S. Pat. No. 3,650,925, the electrowinning of copper at porous cathodes is described; it, however, is directed to extremely dilute solutions, and the electrolyte is augmented. Moreover, the operation of the cell, the disclosed materials, and the disclosed parameters would not lend to operations, such as handling of large amounts of very dilute solutions, because the electrolyte cannot be used in a two element direct ion dependent conversion of the solution, i.e., copper recovery and multipurpose lixiviant production. Other processes are disclosed in U.S. Pat. Nos. 3,716,459; 3,657,101; 3,657,100; 3,464,904; and 3,459,646. These processes are not capable for use or adoption in an overall integrated process for recovery of copper and production of lixiviant from dilute leach solutions. The coproduction of barren leach solutions is also not disclosed as part of a unitary process.

The prior art does not teach a recovered barren leach solution for utilization in a recycling fashion for recovering copper values from copper value sources, such as in mine waste dumps or from in-situ mined copper sources. Moreover, in accordance with the present invention, the preferred pregnant liquor flow through the electrolytic cell is first through a cathode for the cathode reactions to take place and then through a porous anode or by an impermeable anode for the anode reactions to take place so that both functions of pregnant liquor depletion and lixiviant production can be properly achieved. In another embodiment the pregnant liquor may first flow through a porous anode or by an impermeable anode and then through the porous cathode to deposit the metal values in and on the porous cathode.

SUMMARY OF THE INVENTION

An object of this invention is direct electrochemical recovery of high grade copper from dilute acidic solutions in a combination which utilizes liquors for leaching copper-bearing ores, liquors for leaching mine wastes or liquors for in-situ leaching of copper values. Further, an object of this invention is a combination which provides for recovering high grade copper from leach solutions while providing in the total recovery scheme a suitable recycle stream for utilization of lixiviants for laeaching copper values in ores. Still further, an object of this invention is electrochemical winning of copper from pregnant dilute liquor first via a high surface area cathode and then the production of ferric ions and/or acid at the anode which are present in the leach solution or mine water as ferrous ions and water; the effluent solution from the electrolytic cell from which copper has been recovered is a solution suitable for further leaching.

These generalized objects will be explained in further detail herein, while the invention itself will be defined by the claims.

It has been found that when electrowinning copper from very dilute acid solutions, such as from about 0.1 to 5 grams copper per liter of solution, almost cathode grade copper may be obtained from these very dilute, contaminated electrolyte solutions at an overall yield equal to or higher than that which can be achieved when recovering copper by iron cementation.

In general, the present invention comprises a combination whereby a pregnant liquor containing from about 0.1 to 20.0 grams per liter (gpl) copper is recovered from a leaching operation, is clarified, and the clarified pregnant liquor passed through an electrolytic cell housing a cathode of a porous cathode material wherein the copper is recovered, while at the same time ferrous iron, if present in the leach solution is converted from a ferrous to ferric state at the anode instead of, or along with the evolution of oxygen.

With low iron concentrations in the pregnant leach solution oxygen will evolve at the anode. If iron concentration in the present liquor is sufficiently high, i.e., iron is in the ferrous state, then lesser amounts of oxygen, or in the preferred embodiment no oxygen, will be formed and consequently evolved at the anode.

Copper collected at the cathode is a product admixed with the cathode material. The product is then crushed and preferrably pyrometallurgically treated in a furnace. The final copper product is of a high degree of purity, i.e., a purity approaching cathode grade copper. However, the obtained product is different inasmuch as the final refining step is pyrometallurgical.

The cathode material is a relatively inexpensive electrically conducting material such as coke and is used in particulate form for the preparation of the porous cathode shape. The preferred size of the particulate coke is dependent upon actual cathode structure and may be from about minus 10 mesh to about plus 100 mesh or smaller, limited only by the mesh, i.e., porosity of the cathode structure.

When practicing the copper recovery from the cathode material, the coke-copper product is separated from the loose coke. The copper bearing product may, in the preferred embodiment, then go to the furnace. Coke may be also partially recovered by crushing the cathode material and this coke is either recycled to cathode preparation or used as a source of reducing gas in the recovery of copper of almost cathode-type quality.

Thus, the input to the electrolyte cell in the present process merely requires a copper-bearing liquor, electrical energy, a high surface area electrically conductive particulate collector such as coke and water.

BRIEF DESCRIPTION OF THE DRAWINGS

With reference to the drawings, these illustrate the overall aspects of the process and embodiments thereof

DETAILED DESCRIPTION OF THE INVENTION

Figure 1:
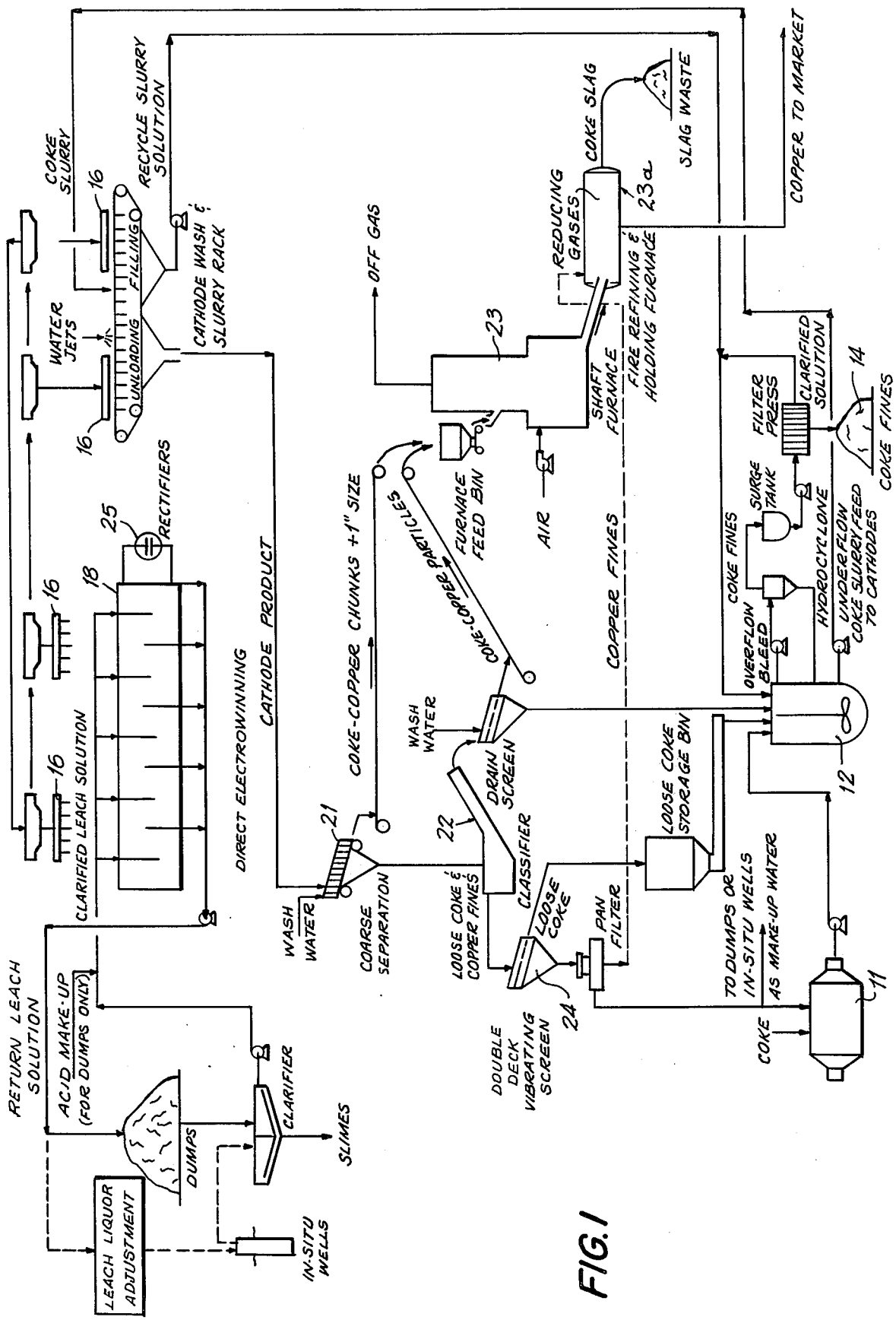
FIG. 1 illustrates the overall process flow sheet.

It has now been found that in direct, once-through directionally dependent electrowinning cell, the disadvantages inherent in the prior art electrowinning or cementation steps are overcome when pregnant liquors from a leaching source and peferably from mine waste dumps and in-situ mining of ore deposits, although in dilute solutions, are recovered while at the same time a suitable leach solution is being produced and while copper of high quality is being produced. In addition, the electrical energy which is being employed to extract copper from mine waters or in-situ liquors provides a cost advantage for the production of a lixiviant whereby a sizable economic increment in efficiency is obtained. In the preferred embodiment much of the iron which may be in the barren leach solution is being treated only in a "once-through" process and returned to the dump or in-situ well as ferric ion which is the desired species of iron ion for leaching of the sulfides of copper.

Inasmuch as the lixiviant solution produces iron when dilute acid is introduced into pyrite rich deposits, the only iron which is present in the pregnant leach solution being treated may be that obtained by leaching of the source mineral and does not require the introduction of iron in the ore body. However, depending on the mineralization of the ore body, the ready adjustability of iron content will become evident upon further discussion of this invention.

The process, as discovered herein, electrowins copper from pregnant liquor or leach solutions while reoxidizing the ferrous ions, if present in sufficient concentration, to ferric ions present in the leach solution extracted from the mineral deposit and thus enables the recycling of a leach solution high in oxidizing power but low in excess iron with respect to the copper-bearing ore.

In many cases the leach liquor contains some ferric ion. In these cases the reduction of ferric ion preceeds the deposition of copper with a corresponding reduction in current efficiency. The cathodic reactions are:

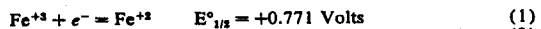
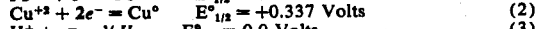
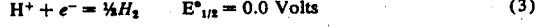

However, many times the leach liquor in the copper leaching reaction produces ferrous ions and may contain sufficient ferrous ion to depolarize the anode, with a corresponding improvement in the voltage efficiency over that of conventional electrowinning. The anodic reaction maybe:

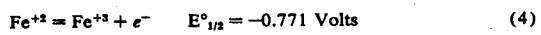

rather than:

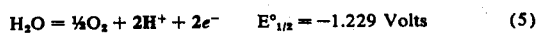

Still further, the overall effect is very much superior to conventional electrowinning because the oxidation of ferrous to ferric ion is one of the advantages, i.e., a desirable lixiviant is produced as part of copper recovery.

In respect to the method now discovered, however, considerable emphasis is placed on the electrowinning of copper from dilute solutions which necessitates the use of cathodes with very high surface areas. The necessity is dictated by the fact that at less than 1 gram per liter of copper, the limiting operating current density is less than 1 ampere per square foot (ASF) of plating surface.

As the current density exceeds 1 ASF, the copper deposited becomes powdery. At further increases in current density, the copper ions do not diffuse to the electrode fast enough. Hydrogen evolution then begins. C. R. Wilke et. al., JECS 100 513 (1953) showed the limiting current, $I_l$, at 0.64 gpl to be 0.56 ASF.

Second, in accordance with this invention, in the presence of iron it is preferred to remove the copper in a single pass through the porous cathode. Multiple passes would result in repeated reductions and oxidation of iron in solution, thus reducing the overall current efficiency. Inasmuch as the cathodes require electrolyte flow-through to obtain the maximum use of the cathode surface, when used in this fashion, the cathode surface or effective plating surface area becomes very large so that the operational current densities of 0.1 ASF at the particulate surface can become effective current densities of 30 ASF (overall cross-section) in the overall unit depending on particle size of cathode material.

For example, at an average current density of 20 ASF, (over all cross-section) the feed to the finely divided coke cathode is 3 gallons per hour per square foot of cathode face, or the equivalent of 0.025 pounds of copper per hour of cathode square foot of cross-section, 0.050 lbs. iron (in ferrous form) per hour of square foot of cathode cross-section and 0.050 pounds per hour of iron (ferric iron) per square foot of cathode. The velocity is then 0.4 feet per hour for the leach solution. However, when the current density is 100 ASF and the gallon through flow on a cathode square foot basis per hour is 15, copper is 0.125 lb., iron as ferrous species is 0.250 lb., and iron as ferric species is 0.250 lb. and the velocity of the leach solution in feet hour is then 2.0.

From the above data, it is fairly evident that the increase in the effective current density provides an increased recovery of copper but the limiting conditions are the effective current density as compared to the apparent current density.

Over 50 runs were conducted with a range of process conditions as shown below.

Range of Process Conditions

Electrolyte Composition
| | |
|---|---|
| $Cu^{+2}$, g/l | 0.5–6.1 |
| $Fe^{+3}$, g/l | 0 –3.0 |
| $Fe^{+2}$, g/l | 0 –4.1 |
| $Al^{+3}$, g/l | 0 –6 |
| $Mg^{+2}$, g/l | 0 –9 |
| pH | 1.1–2.2 |

Cell Parameters
Flow Rate, gpm/ft²
Cathode cross-section .0077–.2
(0.2 gpm/ft² for several hours)
Current Density, ASF 2 – 33
(33 ASF for about 1 hour)
Cell Voltage, Volts – greater than 1.6

The composition used in this work can be compared with that available from commercial copper leach operations. Table I shows analysis for solutions from dump and heap leaching operations. Table II shows the analysis of a vat leach solution.

TABLE I

PREGNANT LEACH SOLUTION ASSAYS

| Leach Solution | $Cu^{++}$ | Fe (Total) | $Fe^{+3}$ | Mg | Al | Ca | $SO_4$ | pH Range |
|---|---|---|---|---|---|---|---|---|
| 1A | 0.48 | 0.58 | 0.43 | 1.47 | 1.15 | 0.58 | — | 2.4–2.6 |
| 1B | .48 | .96 | .71 | 1.89 | 1.50 | .63 | — | 2.4–2.6 |
| 2 | .64 | 1.76 | .64 | 2.33 | 2.90 | .56 | — | 2.4–2.6 |
| 3A | .42 | 1.78 | .48 | 7.75 | 4.60 | .49 | 58.0 | 2.4–2.6 |
| 3B | .60 | 1.82 | .57 | 8.10 | 5.00 | .49 | 62.8 | 2.4–2.6 |
| 4* | up to 8.0 | .28 to 6.6 | .05 to 3.0 | NA | NA | NA | NA | 1.4—3.5 |

*Range for 17 operations in United States.

TABLE II

VAT LEACH ELECTROLYTE CONCENTRATION RANGE

| | grams per liter |
|---|---|
| Cu | 16.5–32.2 |
| $Fe^{+3}$ | 3.26–8.28 |
| Fe(Total) | 7.82–15.3 |
| Al | 7.48–17.20 |
| Ca | .38–.59 |
| Mg | 4.92–10.7 |
| $H_2SO_4$ | 21.0–90.7 |
| Co | .034–.080 |
| Ni | .022–.033 |
| Si | .100–.546 |
| Mn | .512–.870 |
| Na | .173–.358 |
| K | 1.50–2.75 |
| P | 1.23–2.37 |

While the above tabulation provides a range of data actually obtained flow rates can range from as low as 0.0006 gallons per minute per square foot of cathode when the pregnant leach solution contains about 20 g/l copper and 10 g/l $Fe^{++}$ at about 3 ASF to as high as 5.0 gallons per minute per square foot of cathode face when the pregnant leach solutions contains 0.1 g/l copper and is essentially ferric iron free at about 100 ASF.

In Table III the copper extraction recovery is shown for a single pass for various cathode materials based on the coke size or carbon felt. In addition to the copper and iron, the electrolytes typically contained 6 g/l $Al^{+3}$ and 8 g/l $Mg^{+2}$. The flow rates, the flow speed as well as the feed and current density have been related to the extraction of copper as a percent of the total amount in the solution.

Table IV gives the operating data for several typical cells with various coke particle sizes and solutions compositions. The operating voltage varied from 1.6 to 4.5 volts and the current density from 5.3 to 21.5 ASF, while the current efficiency varied from 35 to 82 percent. This resulted in an energy consumption of 0.9 to 3.1 kWh/lb copper.

Table V below summarizes the cell operating parameters for five runs. When the pH ranges from 0.9 to 2.1 the cell voltage ranges from 4.3 to 5.6 volts. The current efficiency (63 to 83%) and the copper extraction (70–90%) are independent of pH.

TABLE III

COPPER EXTRACTION DATA

| TEST DESIGNATION | CATHODE MATERIAL AND MESH SIZE | FLOW (liters/hr) | FLOW RATE (gpm/ft²) | FEED $Cu^{+2}$ | $Fe^{+2}$ (gms/liter) | $Fe^{+3}$ | CURRENT DENSITY (amps/ft²) | COPPER EXTRACTED PERCENT |
|---|---|---|---|---|---|---|---|---|
| A | Coke −4+12* | 0.174 | .010 | 1.0 | 3.0 | 2.8 | 2.8 | 43.0 |
| B | Coke −8+12 | 0.174 | .010 | 1.0 | 3.0 | 2.8 | 4.3 | 67.0 |
| C | Coke −30+60 | 0.174 | .010 | 1.0 | 2.8 | 2.9 | 5.3 | 97.0 |
| D | Coke −16+60 | 0.157 | .009 | 1.11 | 2.7 | 3.0 | 4.5 | 82.0 |
| E | Coke −16+60 | 0.172 | .010 | 1.50 | 3.3 | 2.2 | 4.8 | 99.7 |
| F | Coke −16+60 | 0.316 | .019 | 1.52 | 4.1 | 1.3 | 7.6 | 90.5 |
| G | Coke −16+60 | 0.645 | .039 | 1.52 | 4.1 | 1.3 | 13.9 | 76.3 |
| H | Coke −16+60 | 0.600 | .035 | 1.61 | 3.4 | 1.8 | 16.0 | 90.4 |
| I | Coke −60+100 | 1.17 | .069 | 1.63 | 3.9 | 1.3 | 26.7 | 48.5 |
| J | Carbon Felt | 2.00 | .019 | 0.68 | 1.0 | 1.0 | 4.1 | 72.1 |
| K | Coke −16+60 | 1.73 | .017 | 0.76 | 1.2 | 0.8 | 3.8 | 66.3 |
| L | Coke −16+60 | 4.47 | .043 | 0.70 | 1.2 | .8 | 8.4 | 77.1 |
| M | Coke −16+60 | 6.14 | .060 | 0.63 | 1.3 | .7 | 11.2 | 86.0 |
| N | Coke −60+100 | 4.8 | .046 | 0.70 | 1.2 | .8 | 10.3 | 94.1 |
| O | Coke −16+60 | 1.42 | .014 | 6.08 | 0.1 | 0.1 | 18.5 | 91.0 |
| R | Coke −20+80 | 52.2 | .055 | 1.7 | 0.2 | 0.1 | 21.0 | 90.0 |

*"−40+12" means −4 mesh to +12 mesh

TABLE IV

CELL OPERATING DATA

| TEST DESIGNATION | C | Q | H | P | G | N | M | R |
|---|---|---|---|---|---|---|---|---|
| Coke Mesh Size | −30+60 | *−16+60 | −16+60 | Carbon Felt | −16+60 | −16+100 | −16+60 | −20+80 |
| Anode-Cathode spacing, inches | 0.5 | 0.5 | 0.5 | 1.0 | 1.0 | 1.4 | 1.4 | 1.0 |
| Voltage (volts) | 1.66 | 1.56 | 3.6 | 2.50 | 1.55 | 4.5 | 2.9 | 4.3 |
| Current (amps) | 0.400 | 0.5 | 1.2 | 0.678 | 1.015 | 4.7 | 5.07 | 84.0 |
| Power (watts) | 0.66 | 0.78 | 4.3 | 1.69 | 1.57 | 21.1 | 14.7 | 361.0 |
| Current Density (amps/ft²) | 5.3 | 6.7 | 16.0 | 9.1 | 13.5 | 10.3 | 11.2 | 21.5 |
| Flow Rate (gpm/ft²) | .010 | .021 | .035 | .018 | .0388 | .0465 | .060 | .055 |
| Energy Consumption (kWh/lb Cu recovered) | 1.80 | 0.93 | 2.22 | 2.72 | 0.905 | 3.05 | 2.0 | 2.10 |
| Current Efficiency* | 35 | 64.0 | 61.7 | 35.0 | 62 | 56.3 | 55.4 | 82.0 |

*Defined as the current used to deposit copper, divided by the total current

TABLE V

Cell Operating Perameters at Several pH Values (Total Iron is Less than 0.3g/l)

| Run Number | Current Density ASF | Voltage | Current Efficency Percent | pH | Copper Extraction Percent |
|---|---|---|---|---|---|
| 1 | 20 | 4.3 | 63 | 0.9 | 74 |
| 2 | 20 | 5.6 | 72 | 2.1 | 80 |
| 3 | 21 | 5.2 | 83 | 1.4 | 90 |
| 4 | 20 | 4.4 | 79 | 1.3 | 87 |
| 5 | 17 | 4.8 | 63 | 1.6 | 70 |

With respect to the cathode materials in addition to the coke material various others have been tried, such as carbon felt, graphite, lead wool, copper wool, and copper shot. Void space varies from about 26% (for closest packing) to about 97% (for felt) depending upon the form of the material and method of packing. In most cases, the void space varies from about 40 to 97%. The true surface area of the electrodes also varies over a wide range of from about 2 to 1000 cm²/cm³. The electrical conductivity will also vary over a wide range of values depending upon cathode composition. However, its conductivity should exceed that of the electrolyte. The useful particle size is about 4 to 100 mesh sieve size. The porous electrodes are fixed bed porous electrodes.

As an anode, graphite may be used; however, additionally useful anodes are coke, carbon felt, lead and titanium. Anodes should not be considered to be limited to these materials. In this invention the anode serves as a counter electrode to the cathode and should also embody a means to prohibit (or greatly reduce) backmixing or oxidized products to the cathode in order to increase the current efficiency of the process. As a result, impermeable lead and titanium anodes may be used in conjunction with diaphragms; and when so used, the anodes perform satisfactorily.

The coke material is generally prepared from a raw coal or coal mixtures and may be of the following chemical compositions:

|  | High Volatility Coal | | Medium Volatility Coal | Low Volatility Coal |
|---|---|---|---|---|
|  | "A" | "B" | | |
| Coke Type 1 | 75% | | | 25% |
| Coke Type 2 | 8% | 72% | 20% | |
| Coke Type 3 | | 100% | | |
| Coke Type 4 | | 25% | 20% | 55% |

A critical aspect is that the coke to be used as the porous cathode material have a conductivity above about 0.01 mho-cm⁻¹.

In accordance with the above process, it is desirable to have as large a fraction of the void volume as possible (while maintaining satisfactory conductivity) for the cathodic material. A carbon felt with a 97% porosity has been successfully used but the economic advantages of a coke material are far superior as is evident from the above described embodiments illustrated in the Figures.

In addition, as mentioned before, carbon, lead, and titanium in the form of felt, shot, wool, etc. can be used as long as the volumetric surface area, void volume, and/or porosity constraints are observed.

In general, the electrolytic cell is operated within the following ranges for volumetric surface area: 3 $cm^2/cm^3$ to 1000 $cm^2/cm^3$; for void volume: not less than about 25% and preferably 40% and up to 97% (for carbon felt).

With respect to the cathode and anode preparation the following description, by reference to FIG. 1, will be illustrative. Raw coke is ground in a grinding mill 11, such as rod mill, preferably in the presence of water, then sent to a slurrying tank 12 wherein the fines 14 are carried out as overflow and separated. Further, the slurry as a bottom product of the slurry tank 12 is pumped to the cathode cells 16 removed from the active, operating cell bank 18. One embodiment of cathode-anode cell sections 19 are further illustrated in greater detail in FIG. 4. The slurry is loaded, such as into one of the cathode sections 16, the drained liquid recycled to the slurry tank 12 and the cathode section reloaded into a cell 18 which is then filled with the pregnant leach liquor and restarted.

When the cathodic section 16 in an operating cell has reached its capacity as determined by a predetermined time or by an increased pressure drop (head increase), it is unloaded. The cathode product being removed, washed and the cathode fines removed, such as by coarse screening in a traveling grizzly 21, in which chunks are separated. Further classifying in a classifier 22 separates the loose coke and copper agglomerates. The coke and copper chunks are fed to a furnace 23 (approximately 25% of coke in a cathode section is thus fed to the furnace).

In a double deck vibrating screen 24, the fines from classifier 22 are separated, the top screen retains about +32 mesh particles; bottom screen returns +80 mesh particles and both of these are returned to the loose coke storage bin as indicated in FIG. 1. The dashed line in FIG. 1 indicate optional or conjoint operations and are fully within the scope of the present combination. The loose coke (admixed with copper) is introduced into the slurry tank 12 while the separated copper is introduced into a fire refining holding furnace 23a where the molten metal from the furnace 23 is further refined. As shown in FIG. 1, the various legends amply explain the process sequence and conditions which are further illustrated in FIGS. 2 and 3.

A product melted out of the coke was analyzed to be:

| oz/T | ppm | | | | | | | | | |
|---|---|---|---|---|---|---|---|---|---|---|
| Ag | S | O | Sn | Pb | i | Ni | Sb | Fe | Te | As | Se |
| 0.1 | 720. | 10 | 4 | 7 | .7 | 3 | 4 | 150 | 2 | 2 | N.D. | balance copper.

Even though a melting-refining process is many times the most economically desirable means for obtaining a copper product, other means are not intended to be excluded by the present embodiment. Electrorefining of the coke-copper matrix is an example of such an alternate means. There are many ways of accomplishing the electrorefining. One obvious way is to simply remove the cathodes to a refining tankhouse wherein these cathodes perform as anodes, with the copper being recovered as cathode grade copper.

Figure 4:
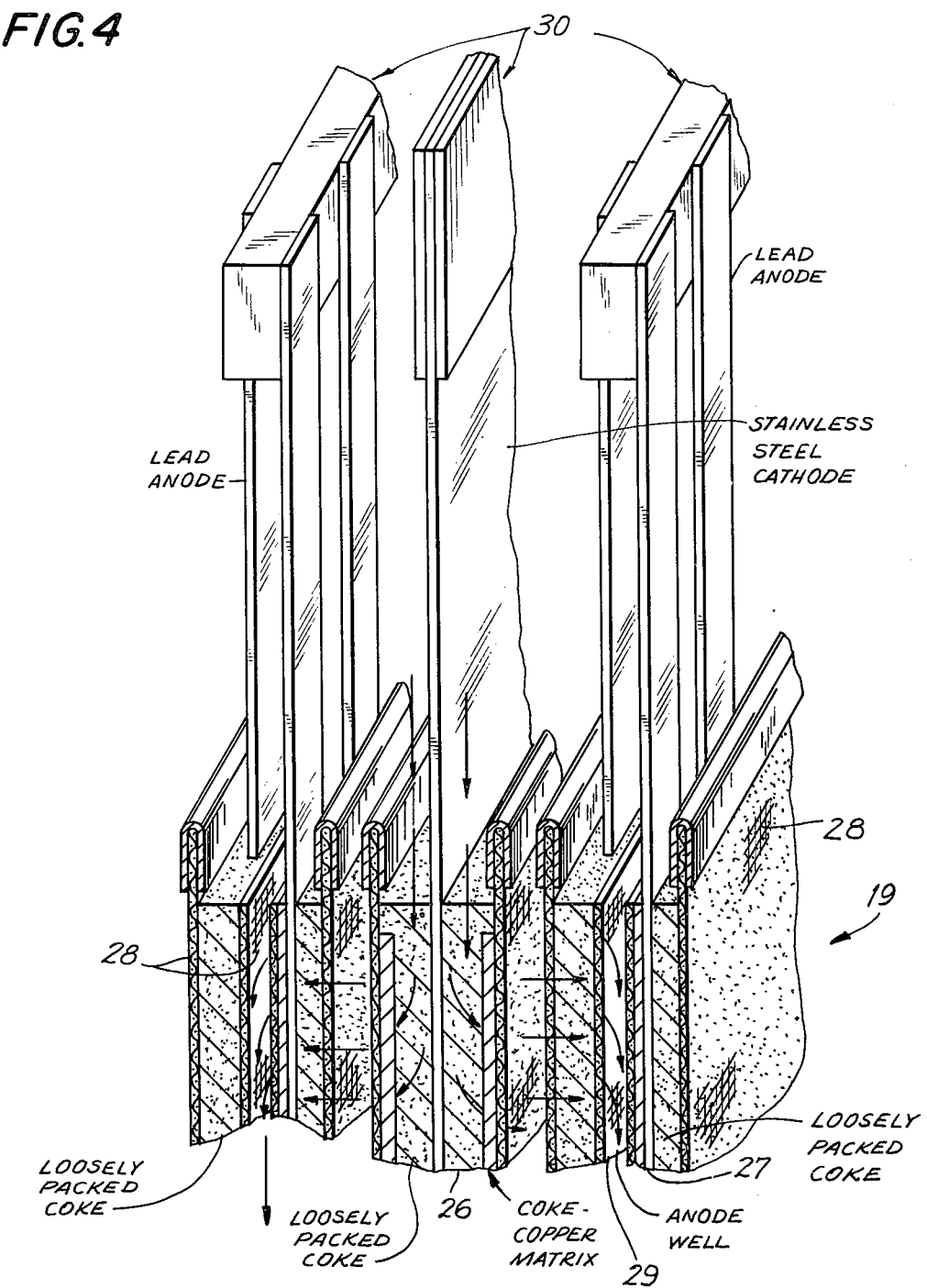
FIG. 4 illustrates, in perspective some details of one embodiment of an electrolytic cell that can be used in the present process.

With reference to FIG. 4, the same illustrates in a fragmentary perspective view an example of a cathode-anode electrolytic cell section, and the flow of liquid is preferable first through the cathodic section 26 and then through the anodic section 27. However, it is within the scope of the invention to reverse the flow pattern within the electrolytic cell by introducing the pregnant leach solution into the anode. Retention screens 28 define the cathodic and anodic sections including the anodic wells 29 into which the useful, barren lixiviant flows. The right most retention screen 28 in FIG. 4, is adjacent, but spaced apart from, a retention screen confining the fine particulate in a next cathodic section. The retention screens 28 may be of Teflon or polypropylene, steel, etc.

The cathodes in each cell are in parallel and the cells are connected in series. The bus bars 30 are hard rolled copper rated at about 750 amp/in². Auxilliary bars (not shown) are for interconnection of cathodes-anodes between cells.

In general, the pH of the available pregnant liquors vary from 0.5 to 3.5. If need be, the pregnant liquor is augmented with acid to control the pH values and to bring it to the desired level of conductivity.

Figure 2:
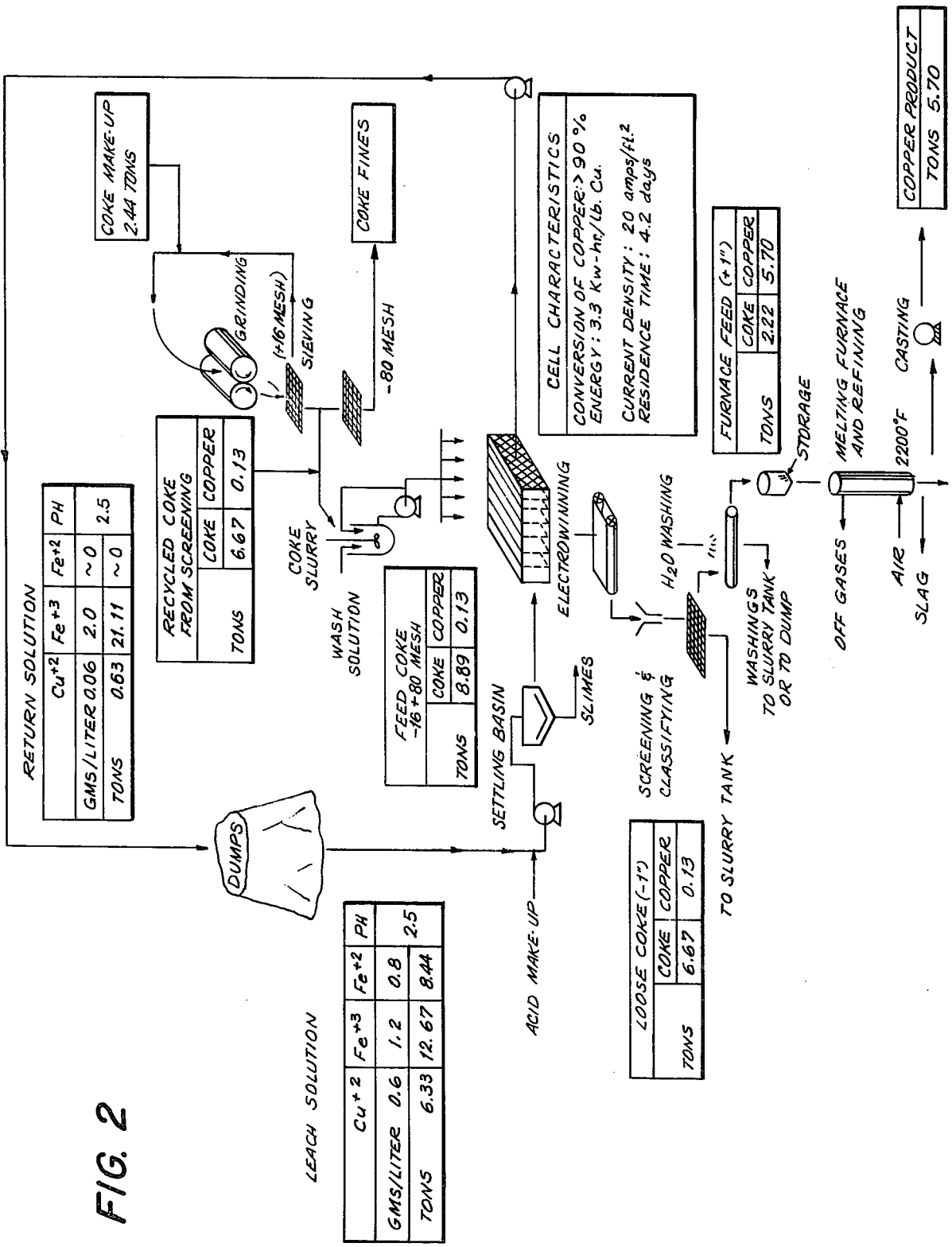
FIG. 2 illustrates a recovery system used for mine dumps, (the drawing is self-explanatory).

With reference to FIG. 2, it illustrates a typical energy and material balance for a process depicted in FIG. 1 as an embodiment for copper recovery from a mine dump leaching solution.

Figure 3:
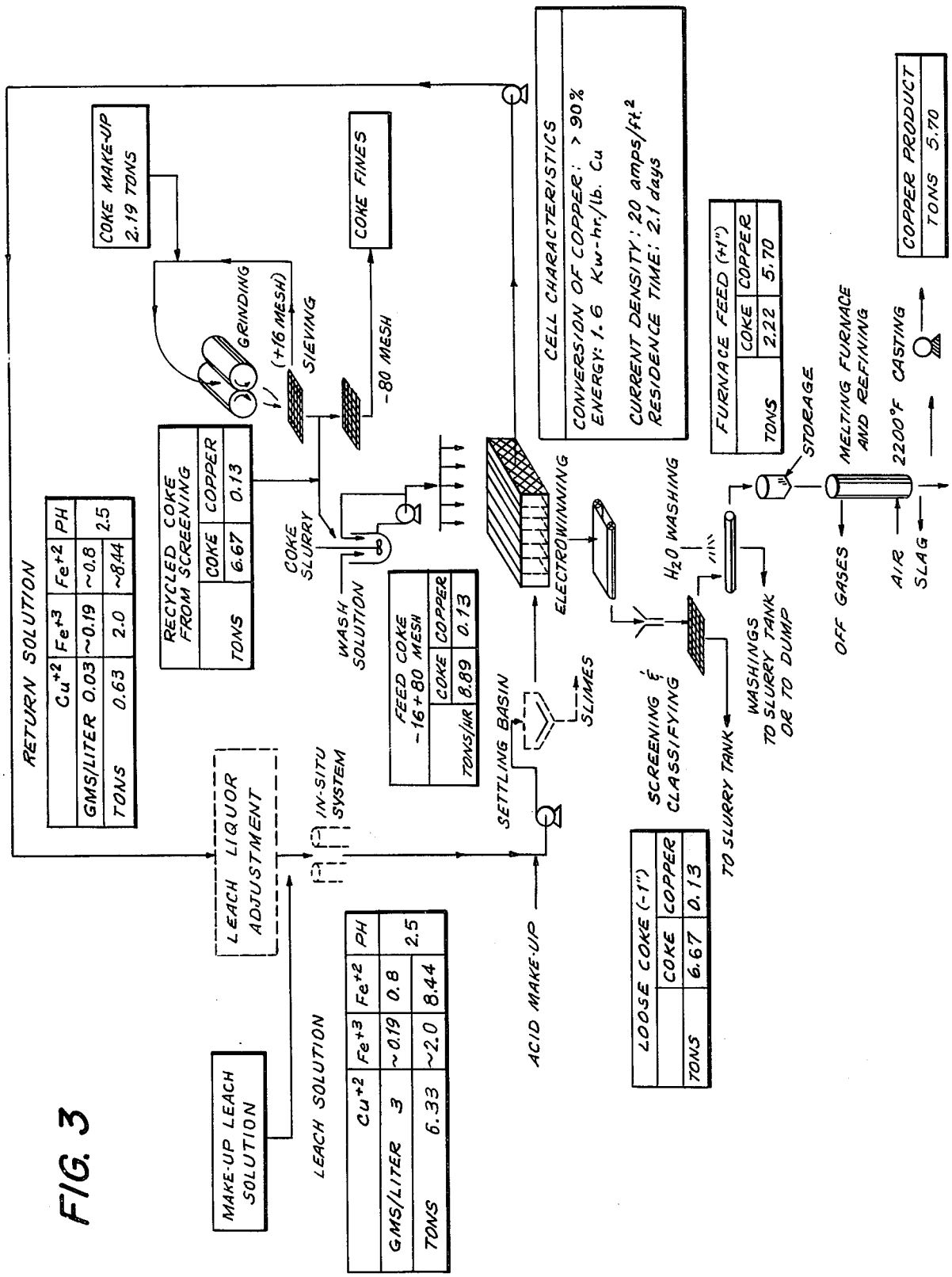
FIG. 3 illustrates a recovery process for an in-situ well system (the drawing is self-explanatory)

Similary, FIG. 3 depicts a typical energy and material balance for a process embodiment directed to a copper recovery from a pregnant leaching liquor obtained in an in-situ mining of copper ores. Note the differences in ferrous and ferric iron in the return leach liquor solution for the systems illustrated in FIGS. 2 and 3. In FIG. 3, the in-situ system, the ferric iron in the return leach solution is about 0.19 g/l. Thus, there is a negligible conversion of ferrous to ferric at the anode. This is in contrast to FIG. 2, dump system, where the ferrous iron is converted to ferric iron at the anode. The drawings are self-explanatory and complement the process described with reference to FIG. 1.

Although various embodiments have been shown and described, the invention and its elements are defined by the claims to follow.

What is claimed is:

1. In a process for recovering copper from dilute solution of pregnant liquor from a copper leaching system, the steps comprising:
    a. maintaining the pH value of said liquor equal to or more acid than a barren leach solution, said liquor comprising from about 0.1 to about 20.0 gpl copper and up to about 10.0 gpl iron as ferrous iron and up to about 10.0 gpl iron as ferric iron, including incidental impurities and solvated metals associated with copper;
    b. introducing said liquor into an electrolysis cell having a cathode of an electrically conductive porous material and an anode;
    c. applying a current such that the current density in said cathode is from about 3 to 100 amps per square foot of cross-section;
    d. flowing said liquor through said electrolysis cell at a rate whereby substantially all copper in said liquor is recovered on said cathodic material; and e. recovering said copper from a cathode product comprised of copper and said cathodic material.

2. The process as defined in claim 1 and wherein the cathode material is a coke material of minus 20 to plus 80 mesh sieve size.

3. The process as defined in claim 2 and wherein less than 25% of coke from the cathode is used for refining said copper.

4. The process as defined in claim 1 and wherein in step (b) said liquor flows first through said cathode and then by or through said anode.

5. The process as defined in claim 1 and wherein in step (b) said liquor flows first through or by said anode and then through said cathode.

6. The process as defined in claim 1 and wherein the pregnant liquor introduced into said electrolysis cell has added thereto an acid to adjust the pH value to less than about 2.2 to increase the liquor conductivity and to maintain solubility of reactants and products.

7. The process as defined in claim 1 and wherein the recovering of copper is from said cathode product by melting and refining treatment of said copper.

8. The process as defined in claim 1 and wherein the cathode product from the electrolysis cell is classified before introduction into a furnace zone and the fines thereof admixed with a make-up, electrically conductive porous material, for forming a slurry of a particle size between ½ inch to 100 mesh sieve size, suitable for introduction in said electrolysis cell.

9. The process as defined in claim 1 wherein the copper is recovered from said cathode product by electrorefining.

10. The process as defined in claim 1 wherein said electrically conductive material is of sieve size between +4 to +260 mesh.

11. The process as defined in claim 1 and wherein the cathode material is of a porosity from about 25 to about 97% at the outset of the electrolytic reaction of said pregnant liquor.

12. The process as defined in claim 1 and wherein copper of 99.8% purity is produced.

13. The process as defined in claim 1 and wherein reprocessed coke with an average copper content of about 2% is returned as a slurry to a cathode as an electrically conductive porous material for said electrolysis cell for forming said cathode.

14. The process as defined in claim 1 and wherein the pregnant liquor velocity through said cathode is from about 0.0006 to 5.0 gallons per minute/ft$^2$ of cathode face.

15. The process as defined in claim 1 and wherein the liquid flows through the cell once, before it is reconstituted as a barren leaching liquid depleted in copper.

16. The process as defined in claim 1 and wherein a barren leach solution is returned as a regenerated lixiviant to the copper leaching system lower in ferrous iron as compared to the pregnant liquor.

* * * * *